Patented Aug. 30, 1927.

1,640,901

UNITED STATES PATENT OFFICE.

RUDOLF LIESKE, OF LEVERKUSEN, NEAR COLOGNE, WERNER SCHULEMANN, OF VOHWINKEL, NEAR ELBERFELD, AND WILHELM BONRATH, OF LEVERKUSEN, NEAR COLOGNE, GERMANY, ASSIGNORS, BY MESNE ASSIGNMENTS, TO WINTHROP CHEMICAL COMPANY, OF NEW YORK, N. Y., A CORPORATION OF NEW YORK.

DISINFECTING AGENT.

No Drawing.   Application filed January 28, 1925. Serial No. 5,340.

As it is known plants, seed or soil can be disinfected by treating them with solutions of mercury salts or other mercury compounds.

We have now found that a better result is obtainable in a simpler and cheaper way by treating plants, seed, soil or the like with solutions of organic mercury compounds in mixture with alkali metal phenolates or with caustic alkali and phenols. The organic mercury compounds react with the phenolates in the presence of water, forming compounds having superior disinfecting properties. The reaction probably takes place in accordance with the following general formula:

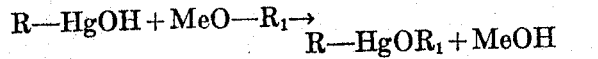

in which R and $R_1$ stand for aromatic residues and Me stands for an alkali metal. In the case of mercurized nitrophenol and sodium phenolate the reaction probably is as follows:

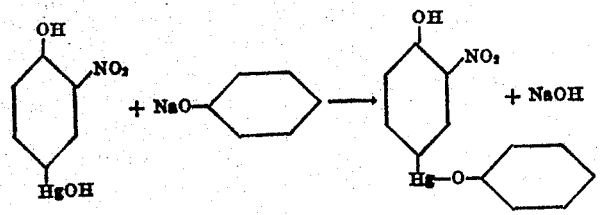

In this way it is possible to employ also insoluble mercury compounds. As examples we name the following products: mercurized phenol, mercurichlorophenolsulfate, mercuriphenolacetate, mercuricresolcyanide, mercurized para-nitrophenol, mercuribenzoic acid, mercurichlorobenzoic acid, mercurized orthonitrophenolacetate, mercurized paranitrophenolanhydride, the sodium salt of mercurized nitrophenol, mercurized naphthol, mercurized bromonaphthol, mercurized nitrochloronaphthol, mercurized cresol, mercurized nitrocresol, mercurized nitrochlorocresol, etc. Other ingredients can be added e. g. ferricyanide of potassium, sodium chloride etc.

The new products have proved to be valuable disinfecting agents e. g. for seed, plants and soil. They destroy seed-borne fungi and bacteria capable of causing diseases of plants and the micro-organisms present in the soil which are capable of causing plant diseases.

For preparing these mixtures the ingredients are thoroughly mixed together e. g. 10 parts of mercurized nitrophenol with 10 parts of sodium phenolate and 80 parts of sodium chloride.

The sodium chloride is chemically inert in the composition and serves merely as a diluent. Inert materials, such as the sodium chloride, are often desirable in the compositions where they may serve to give compositions adapted for special uses or having a predetermined percentage of mercury.

For disinfecting plants or seed a one per cent aqueous solution of this mixture is used.

We claim:

1. The herein described new disinfecting, bactericidal, insecticidal and fungicidal preparations formed by mixing an organic mercury compound with an alkali metal phenolate, said mercury compound and alkali-metal phenolate being capable of interacting in the presence of water to form a compound having superior disinfecting, bactericidal, insecticidal and fungicidal properties, substantially as described.

2. The herein described new disinfecting, bactericidal, insecticidal and fungicidal preparations formed by mixing an organic mercury compound with an alkali metal phenolate said mercury compound and alkali-metal phenolate being capable of interacting in the presence of water to form a compound having superior disinfecting, bactericidal, insecticidal and fungicidal properties, and an inert material, substantially as described.

3. The herein described new disinfecting, bactericidal, insecticidal and fungicidal preparations formed by mixing an organic mercury compound with a phenol and an alkali, said organic mercury compound, phenol, and alkali being capable of interacting in the presence of water to form a compound having superior disinfecting, bactericidal, insecticidal and fungicidal properties, substantially as described.

4. The herein described new disinfecting, bactericidal, insecticidal and fungicidal preparations formed by mixing an organic mercury compound with a phenol and an alkali said organic mercury compound, phenol, and alkali being capable of interacting in the presence of water to form a compound having superior disinfecting, bactericidal, insecticidal and fungicidal properties, and an inert material substantially as described.

5. Process for disinfecting plants, seed and soil which consists in applying thereto a preparation formed by mixing an organic mercury compound, an alkali and a phenol, said organic mercury compound, alkali, and phenol being capable of interacting in the presence of water to form a compound having superior disinfecting, bactericidal, insecticidal and fungicidal properties.

6. Process for disinfecting plants, seed and soil which consists in applying thereto a preparation formed by mixing an organic mercury compound and an alkali metal phenolate, said mercury compound and alkali-metal phenolate being capable of interacting in the presence of water to form a compound having superior disinfecting, bactericidal, insecticidal and fungicidal properties.

In testimony whereof we have hereunto set our hands.

RUDOLF LIESKE.
WERNER SCHULEMANN.
WILHELM BONRATH.